April 15, 1952     F. O. JOHNSON     2,593,151
DISPENSING MACHINE
Filed Jan. 18, 1947     5 Sheets-Sheet 1
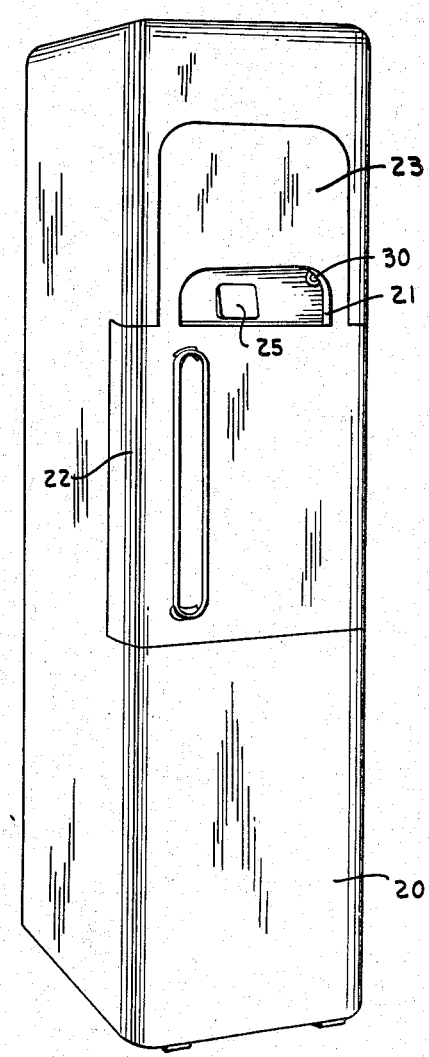
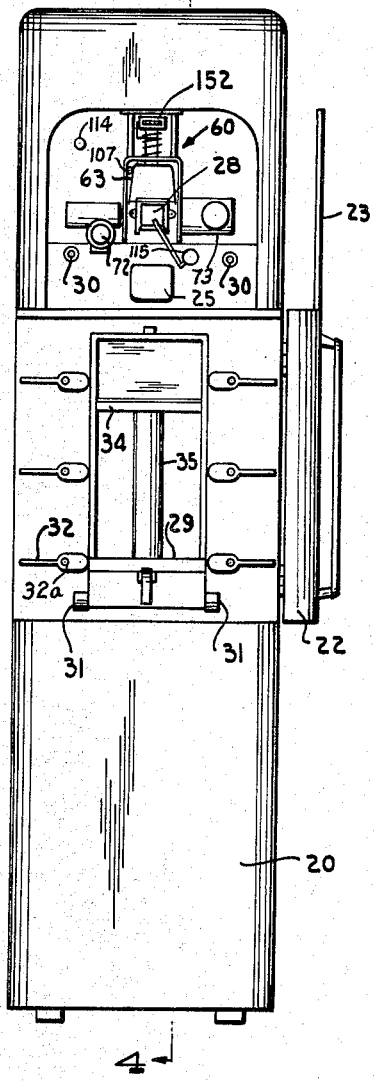
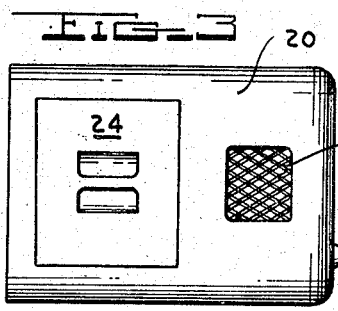
INVENTOR.
FREDERICK ORLO JOHNSON
BY
*Arthur M. Smith*
ATTORNEY

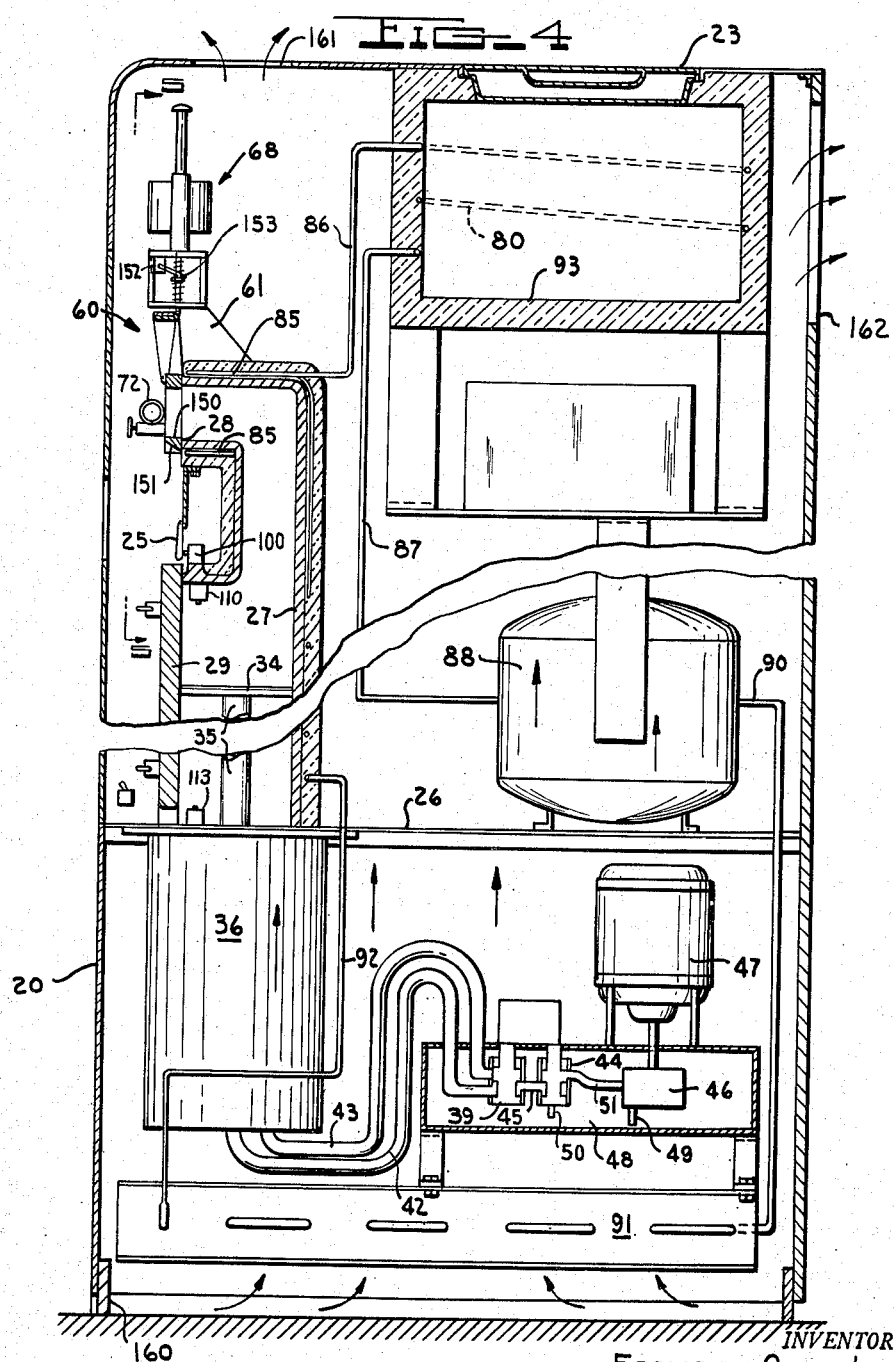

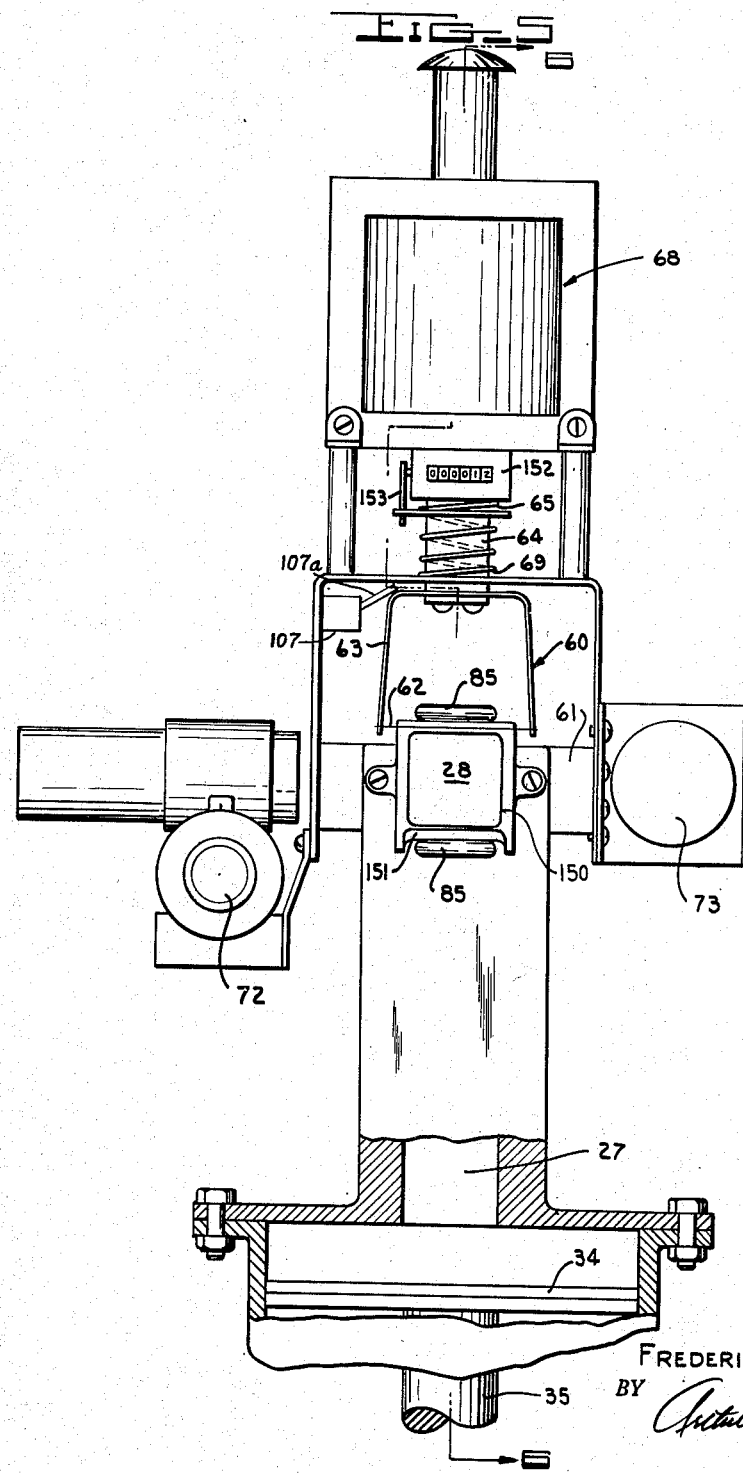

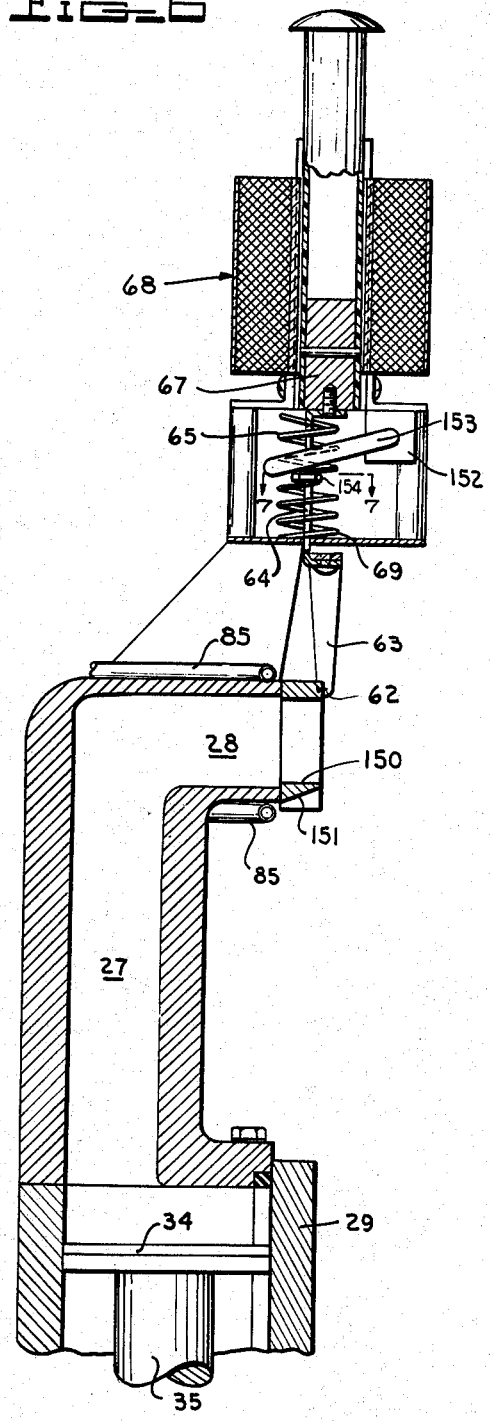
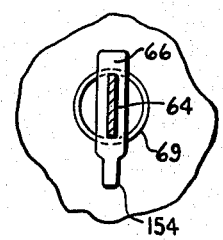

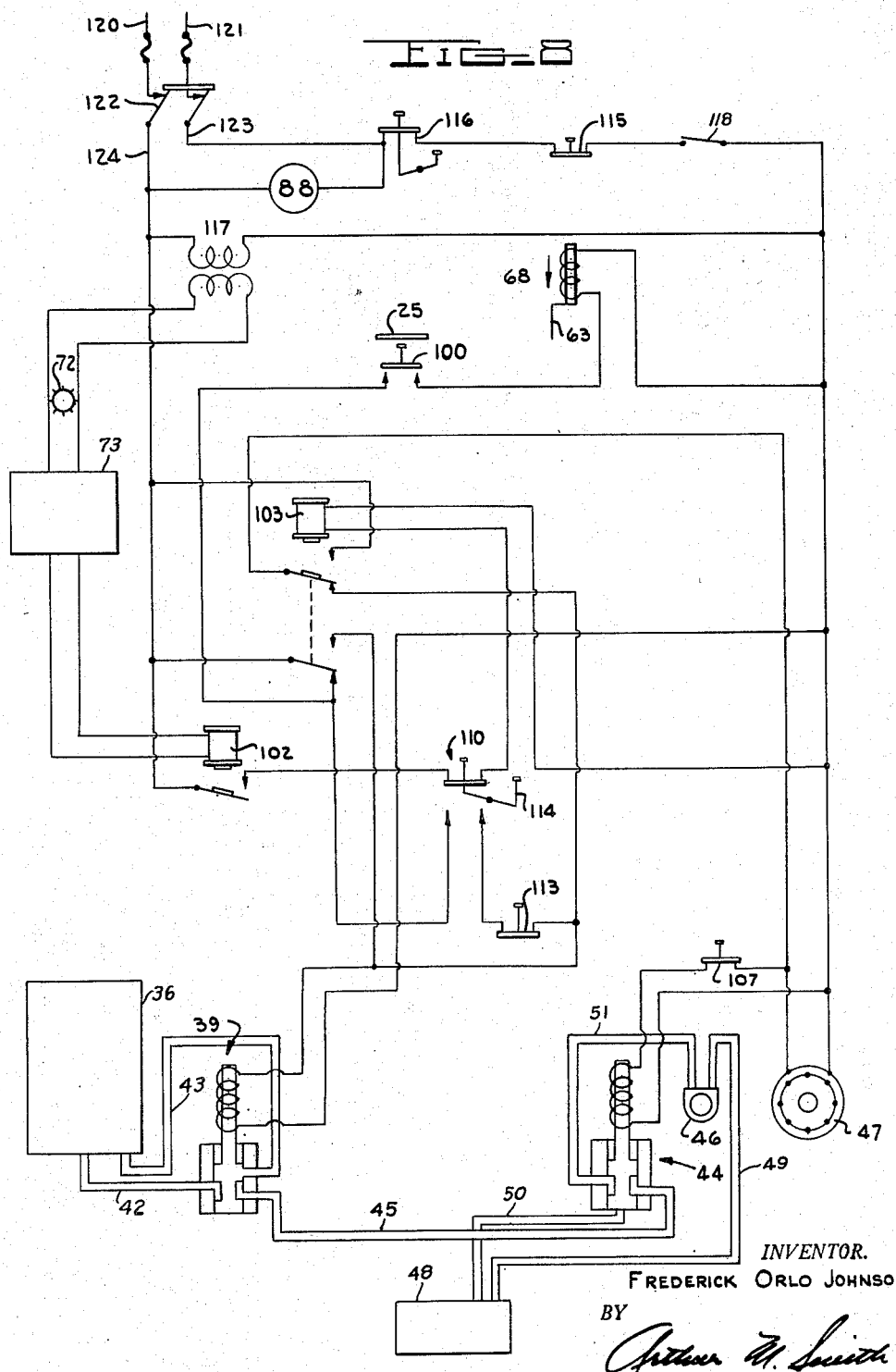

Patented Apr. 15, 1952

2,593,151

UNITED STATES PATENT OFFICE 2,593,151

DISPENSING MACHINE

Frederick Orlo Johnson, Birmingham, Mich.

Application January 18, 1947, Serial No. 722,893

3 Claims. (Cl. 31—12)

The present invention relates to a dispensing machine and particularly to such a machine adapted to extrude, cut off and dispense a selected portion of an extrudable material such, for example, as butter and the like or similar substances.

The present application is related to my Patent No. 2,478,401, issued August 9, 1949 and relates to improvements in the machine there shown.

A principal object of the present invention is to provide a dispensing machine in which butter or a like extrudable substance may be maintained at a desired extrusion temperature by means of a mechanical refrigeration unit and extruded from a container or pressure chamber in selected amounts at a fixed temperature and is thereafter severed by a reciprocating cutter to produce blocks or pieces thereof of a satisfactory appearance, a desired consistency and uniform size, and without being touched by hands.

It is a further object of the present invention to provide such a dispensing machine which is practically noiseless in operation, and of a relatively simple construction, easy to operate and service, and which is positive in its operation. The machine of the present invention being so designed and constructed as to conform to all sanitary regulations for machines utilized in the handling and dispensing of foodstuffs or dairy products.

A further object of the present invention is to provide a dispensing machine particularly adapted for extruding and dispensing butter and the like or similar materials in which separate blocks, chips, patties or servings are selectively cut from an extruded strip of such material and in which the thickness of each individual piece conforms to a desired standard of thickness, which standard may be varied by a simple adjustment of the machine.

It is the further object of the present invention to provide a dispensing machine in which print, roll or bulk butter or similar materials may be utilized in the machine and discharged therefrom through an extrusion orifice of selected size and shape and in which the individual servings will be cut as needed upon each operation of the machine, thus reducing waste of the butter or similar materials while assuring uniform servings thereof to the consumer.

A further object of the present invention is to provide a machine for dispensing butter or similar materials in which the thickness of the individual servings may be easily regulated to assure the serving of a predetermined portion to each customer, the machine having a sanitary, refrigerated chamber in which the bulk material is stored so that the entire operation of extruding, cutting and dispensing the said predetermined portions is accomplished without allowing the materials to come in contact with sources of contamination.

It is the further object of the present invention to provide a machine particularly adapted for dispensing butter or similar extrudable food materials in which the thickness and the consistency of the dispensed patty or chip is controlled at the point where the patty or chip is separated from the continuous strip of extruded material.

A dispensing machine embodying the present invention, like the machine of the said Patent No. 2,478,401, is particularly adapted for forming butter chips or patties such as are served in restaurants, hotel dining rooms, and other places where a number of individual portions of butter are needed. Conventional methods of providing separate patties or chips of butter have not been satisfactory either from the economic or the sanitary standpoint. From the economic standpoint the variations in thickness of the butter pats or chips when cut manually, or by the machines previously known in the art, prevents an accurate ascertainment of the number of servings supplied from a given amount of butter. It frequently occurs that with several customers seated at a table, the variations in thickness of the butter pats or chips will be so marked as to lead to customer complaints and frequently for requests for additional butter. Such procedures, in addition to causing customer complaints also are not economical for some customers will get more butter than needed while other customers will get less butter than needed. In conventional practice the separated butter chips or patties are prepared in advance of being served and are floated in a container of ice water or the like from which they are removed as needed at the time of serving the customer. The salt is washed out of the butter by the water and this impairs the flavor. Also, the color is bleached out, impairing the appearance. Such methods also usually produce a hard and brittle chip which usually is difficult to remove from the ice water in the container and which does not have a proper spreading consistency when served to the customer. In addition, such methods of handling butter in open containers provide many opportunities for contamination of the butter and this alone is frequently a source of substantial loss in the handling and serving of butter.

Other objects of this invention will appear in the following description and appended claims, reference being had to the accompanying drawings forming a part of this specification wherein like reference characters designate corresponding parts in the several views.

In the drawings:

Fig. 1 is a front perspective view of a preferred form of dispensing machine embodying the present invention.

Fig. 2 is a front elevation of the machine shown in Fig. 1, but showing the access door in its open position.

Fig. 3 is a top plan view of the machine shown in Fig. 1.

Fig. 4 is a fragmentary enlarged section taken substantially on the line 4—4 of Fig. 2, in the direction of the arrows.

Fig. 5 is an enlarged elevation of the cut-off mechanism and associated parts showing the cut-off knife in its retracted position, the view showing that portion of the machine indicated by the line 5—5 in Fig. 4, and looking in the direction of the arrows.

Fig. 6 is a section taken substantially on the line 6—6, Fig. 5 in the direction of the arrows.

Fig. 7 is a section taken substantially on the line 7—7, Fig. 6 in the direction of the arrows.

Fig. 8 is a circuit diagram showing the electrical control circuit embodied in a machine embodying the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A dispensing machine of the present invention in a preferred embodiment shown in the drawings, by way of example, comprises a housing 20 enclosing all parts of the mechanism. A dispensing opening 21 is provided in the front face of the hinged access door 22 which extends across the front face of the housing 20 and which when open permits access to the dispensing tube as shown in Fig. 2 and as hereinafter more fully described. The upper portion 23 of the door 22 is located on the face portion of the housing 20 and permits access to the dispensing mechanism and cut-off knife when the door 22 is open, to be hereinafter more fully described. An access door 24, Fig. 3, in the top of the housing 20 communicates with a refrigerated storage chamber 93, Fig. 4, for the convenient storage of the materials to be dispensed. A contact plate 25 is provided in the dispensing opening 21 and is adapted to be actuated by the user when a portion of material is to be dispensed from the machine. The contact plate 25 is covered with a resilient covering and is so arranged as to move the operating switch upon the application of pressures as slight as five (5) ounces thereon and is so located relative to the dispensing mechanism of the machine that if contacted by a plate or similar receptacle, the dispensed material will be cut off and drop directly on such plate or similar receptacle. Lights 30 are placed inside the door 24 on each side of the dispensing opening 21 and serve to illuminate the dispensing opening 21 and the plate 25.

The mechanism enclosed in the housing 20, as shown in Fig. 4 is mounted on the rigid frame member 26 which is partly composed of fiber or other heat insulating material to prevent transference of cold from butter tube to frame of machine. The mechanism includes a storage and dispensing tube 27 having an extrusion orifice 28 of any desired cross sectional configuration, but which is here shown as being substantially square. The dispensing tube 27 terminates in a substantially vertical top duct section from which the extrusion orifice 28 extends substantially at right angles. When used to dispense butter or similar food or dairy products, the tube 27 and extrusion orifice 28 are preferably formed of a non-corrosive sanitary material such, for example, as dairy metal, plastics, glass, porcelain, china, and the like or similar materials. As here shown, the body portion of the tube 27 consists of three sides, preferably formed of dairy metal, and is provided with a pivoted face plate 29 which preferably is also formed of dairy metal. The plate 29 is pivotally connected to the brackets 31 carried on the base of the side walls of the dispensing tube 27. Clamping lugs 32, three of which have right-hand threads, and three of which have left-hand threads, are secured to the housing on opposite sides of the plate 29 and are rotatably mounted on the pins 32a to permit clamping of the plate 29 against the side walls of the dispensing tube 27. In Fig. 2, the plate 29 is shown in its open position to permit servicing of the machine or filling it with butter, and from this view it will be seen that ready access is had to the entire interior of the tube 27 when the plate 29 is open. This facilitates servicing and cleaning of the machine. The use of such a pivoted plate is recommended for it permits full visual inspection of the interior of the tube 27 when the plate 29 is open. As here shown, the dispensing tube 27 and the extrusion orifice 28 are formed as a single casting of metal but it is to be understood that they may be formed separately, or that they may be fabricated from sheet stock, if desired.

The dispensing tube 27 as shown in Fig. 4 has an open bottom through which extends a pressure plate 34 which is reciprocally mounted in the dispensing tube 27 and is adapted to exert a pressure on the contents of the tube 27 to force such contents upwardly through the extrusion orifice 28. The pressure plate 34 is caused to reciprocate in the dispensing tube 27 by a two speed hydraulic power member acting through a ram 35.

The hydraulic ram 35 is actuated by an enclosed cylinder 36 in which is mounted an hydraulically actuated power driven piston as described in my said Patent No. 2,478,401 to which reference is made for any additional required details.

Hydraulic lines 42 and 43 communicate with the interior of the cylinder 36 and lead through a solenoid controlled hydraulic flow valve 39 (Fig. 4) which in turn is connected with the pressure line 45 leading from the discharge port of a by-pass valve 44 which is connected with an hydraulic pump 46 driven by an electric motor 47. Hydraulic fluid is normally maintained in an hydraulic sump 48 and is drawn therefrom by the pump 46 through an intake line 49. A return line 50 leads from the by-pass control valve 44 to return a by-pass fluid to the sump 48 when required. A supply line 51 leads from the valve 44 to the pump 46. The hydraulic control valves each comprise a solenoid controlled spool or plunger which is moved as required by the energizing or de-energizing of the electrical control circuit. The operation and control of the said hydraulic circuit will be more fully described hereinafter in connection with the description of the operation of the machine.

A cut-off mechanism 60 (best shown in Figs. 4 and 5) is mounted on a bracket 61 which is secured to the top portion of the casting in which the extrusion orifice 28 is formed. The cut-off mechanism 60 comprises a vertically reciprocating knife 62 here shown as a steel wire secured in tension to the opposed arms of an inverted U-shaped knife bracket 63 mounted on a reciprocating slide.

The reciprocating slide 64, as shown in Fig. 6, is operatively connected with the plunger 67 of an electrically actuated solenoid 68 which imparts a power stroke to the knife 62 when it is moved in the downward direction. A return spring 69 is connected between the slide 64 and the bracket 61 and seats on the spring seat 66 to assist in returning the knife 62 to its raised position after completion of the cut-off stroke. A cushioning spring 65 is seated on the seat 66 and extends upwardly from the knife 62 and around the slide 64. As shown in Figs. 4, 5, and 6 the knife 62 is in its raised position and is ready for the cut-off operation.

The thickness of each cut of extruded material is controlled by an adjustable control mechanism which includes a light source 72 and a photo-electric control device 73. The exciter lamp (not shown) which is mounted within the light source 72, is electrically connected with an electric power source and the light emitted thereby is focused on the sensitive element of the photoelectric control device 73.

When extruded material blocks the light from between the light source 72 and the photo-electric control device 73, the operation of the machine is stopped, until the cut-off mechanism 60 is actuated. When the chip of extruded material is cut off and falls down, the light falls again on the control device 73 and the machine is then operated until the extruded material again blocks off the light from the photo-electric control circuit 73 when the machine is again stopped.

In order to maintain the proper consistency or plasticity of the material to be extruded, it is desirable to control the temperature of the tube 27 and of the orifice 28. In the case of extruding material such as butter, refrigerating coils 85 are secured in heat exchange relation to the walls of the tube 27 and extend on both the top and bottom walls or all four walls of the orifice 28 and act to maintain these walls at the desired temperature to regulate the plasticity of the butter. The refrigerating coils 85 are connected through lines 86 and 87 to a refrigerant compressor 88. The refrigerant is pumped by the compressor 88 through a line 90 connected with a condenser 91 which in turn is connected by a line 92 with the coils.

The cooling coils 80 are located in the thermally insulated bulk storage compartment 93 and maintain the desired temperature therein. The compartment 93 provides a readily available source for the bulk storage of material to be extruded from the machine and ready access is had to this compartment through the access door 24 opening in the top of the housing 20.

The operation of the machine will be best understood by reference to Fig. 8 in which the electrical control circuits of the machine are shown diagrammatically. As there shown, the machine is connected with a source of electric power supplied through the lead lines 120 and 121 and through a main switch 122 to the supply lines 123 and 124. A switch 100 is electrically connected in the circuit and is the starting switch for the machine. The switch 100 is actuated by movement of the plate 25 to close the circuit and energize the knife solenoid 68 to cut off the previously extruded material to form the separated chip.

This is the only action of the machine which is controlled directly by said switch 100.

The light source 72 is electrically connected in the circuit and activates the photo-electric tube device 73 which closes a telephone-type relay 102 electrically connected therewith to actuate the electrically connected relay 103 which establishes the circuit to the solenoid controlled hydraulic flow valve 39 and to the hydraulic pump motor 47. When the circuit is closed through the relays 102 and 103, the motor 47 operates the hydraulic pump 46 to cause a flow of hydraulic pressure fluid through the valve 39 to the cylinder 36. When sufficient material is extruded through the extrusion orifice 28 to break the light beam from the light source 72 as previously described, the relay 102 is de-energized by the photo-electric tube circuit 73 and the flow of current to the relay 103 is broken. This completes one cycle of the machine.

To prevent cutting of the extruded material by operation of the cut-off mechanism 60 on the backstroke of the knife 62, provision is made to prevent feeding of the material when the knife 62 is in the down position. This is accomplished by the use of a by-pass switch 107 which is operated by an arm or contact point on the shoulder of the knife carrying bracket 63. The switch 107 is closed only when the knife 62 is in its fully raised position, as at the beginning of a cycle. Until switch 107 is closed, the valve 44 acts to by-pass the oil flow from the pump 46 to the sump 48 through the line 50. When the switch 107 is closed by the return of the knife 62 to the raised position, the valve 44 is actuated to prevent further by-passing of the pressure fluid and the hydraulic flow is maintained through the line 45 to the valve 39 and to the cylinder 36. This causes extrusion of the material through the orifice 28 until the desired amount is extruded at which time the circuit to the motor 47 is broken and this cuts off the supply of hydraulic pressure fluid to the cylinder 36, as previously described.

The reversing cycle of the cylinder 36 as here shown is controlled through a semi-automatic manually reset circuit. When the piston reaches the top of the cylinder 36 it contacts a switch 110 which operates the solenoid on the valve 39 to establish a flow of pressure fluid through valve 39 so that the hydraulic pressure fluid flow is reversed through the lines to the cylinder 36. The return of the piston in the cylinder 36 carries with it the return of the pressure member 34 in the tube 27. When the pressure member 34 is fully returned it opens switch 113 to shut off the motor 47 and at the same time acts on the solenoid valve 44 to by-pass the hydraulic pressure fluid through the line 50.

The manual reset button 114 can be operated when the plate 29 is closed and the machine is ready to function.

In the event that the machine should continue to operate to extrude material through the orifice 28, as for example upon failure of the controls to function properly, the machine would continue to extrude material through the orifice 28. When the material is so extruded to a point where it makes physical contact with the switch 115 the circuit controlling the extrusion is broken and the feeding mechanism is prevented from operating. This, however, does not affect the circuit to the refrigerant compressor 88 so that the temperature of the machine continues to be maintained at the desired level.

A night switch 116 is electrically connected in the circuit and is manually operated so as to cut-off the circuit through the extruding mechanism of the machine without cutting off the flow of current through the circuit to the refrigerant compressor 88. As shown in the circuit diagram, the refrigerator compressor 88 is electrically connected in the main circuit 123, 124, through a thermal switch 118, with a suitable source of electric current. A transformer 117 is provided in the circuit to reduce the current in the main line to a six-volt, or other suitable current, for operating the photo-electric circuit. A lead is also taken from the main circuit to provide a power circuit to the motor 47.

When the relays 102 and 103 are energized the current flows between the leads 120 and 121 in series through the switch 116, switch 115, the motor 47 and one of the double throw switches controlled by the relay 103. At the same time current flows between the leads 120 and 121 through the switch 116, the solenoid which operates the valve 39 and a second double throw switch controlled by the relay 103.

When the relays 102 and 103 are de-energized and the switch 110 is closed current may flow in series between the leads 120 and 121, through the switch 116, switch 115, the motor 47, the first mentioned double throw switch controlled by the relay 103, switch 113, switch 110 and the second mentioned double throw switch controlled by the relay 103. At the same time current will flow between the leads 120 and 121, through the switch 116, the solenoid which operates the valve 39, switch 113, switch 110 and the second double throw switch controlled by the relay 103.

The solenoid 68 is connected with the leads 120 and 121 through the switch 116, switch 100 and the second mentioned double throw switch controlled by the relay 103 when the latter is de-energized.

The solenoid which operates the valve 44 is connected in series with the leads 120 and 121 through the switch 116, switch 107, the first mentioned double throw switch controlled by the relay 103, in the de-energized position thereof, the switch 113, the switch 110 and the second mentioned double throw switch controlled by the relay 103.

In the description of the machine it has been contemplated that a single valve 39 may be provided, the spool of which may be moved by the action of the solenoid into various operating positions for controlling and directing the flow of hydraulic pressure fluid through the hydraulic circuit to carry out the intended operations of the machine.

I have found that the provision of the extrusion nozzle 28 extending substantially at right angles to the vertical tube 27 overcomes any tendency of the extruded material to curl as it is discharged from the orifice of the extrusion nozzle 28. Thus, each operation of the cut-off knife cuts a patty whose sides are substantially parallel. The accurate formation of the patties is also facilitated by the provision of an extruding die 150 which has an inclined or tapered lower lip 151, which acts to contact the wire 62 at the end of its cut-off stroke and cleans it of any adherent butter particles during the time it is retracted to its raised position.

In order to record the number of operations of the machine, I have provided a counter 152 whose spring loaded arm 153 engages the shoulder 154 on the spring seat 66. Thus each time the spring seat 66 is moved downwardly by operation of the cut-off knife mechanism 60, the counter is actuated and records the number of the knife strokes. The knife stroke is resiliently cushioned in both directions by the springs 65 and 69 so that the reciprocation of the slide 64 is controlled to permit the directional actuation of the counter mechanism 152 in response to the vertical movement of the knife mechanism 60. By the use of such counting devices a dispensing machine of the present invention may be installed, for example, in a restaurant or similar eating place on a lease with the rental determined by the extent of use of the machine.

The mechanical refrigeration here provided is preferably controlled by a thermally responsive element located in the extrusion nozzle 28 and which is set to control the temperatures at this point at from approximately 40 degrees to approximately 45 degrees F., or at any suitable temperature depending on the material being extruded. This temperature in the extrusion nozzle has been found to provide the most satisfactory extrusion of butter but may be varied as required for other materials. Since cooling coils 85 are located both above and below the extrusion orifice, it will be seen that the temperature of the extruded material is controlled adjacent the point of its extrusion. In this way the temperatures of the machine are controlled directly with respect to the plastic consistency of the extruded materials at the extrusion orifice.

As shown in Fig. 4, the arrangement and location of the refrigerating unit in the casing 20 is such that a flow of air is induced through the casing 20 as indicated by the direction arrows. As here shown the bottom 160 of the casing 20 is open so that cooled air is drawn inwardly from the floor and flows upwardly through the condenser 91. The casing 20 is provided with a ventilator 161 in the top and with a ventilator 162 in the back wall near the top. This provides a stack effect which, combined with the upward flow of the heated air from the condenser 91, provides a sufficient air circulation in the housing 20 to eliminate the need for a fan in connection with the refrigerator mechanism. This air circulation, as shown by the arrows, Fig. 4, extends throughout the interior of the housing 20 and thus has a cooling effect on all parts of the unit.

The lights 30 on each side of aperture 21 are concealed by the door 22 and thus provide an indirect illumination of the aperture 21 and the operating plate 25 without a shadow. The lights 30 may be masked as desired, either by a shade or by parts of the unit, to prevent any interference with the light beam for actuating the photo-electric control circuit.

As shown in Fig. 2, it will be seen that the door 22 is hinged so as to give access to the entire width of the machine and this permits the mounting of the clamps 32 directly on the housing of the machine. This prevents much transfer of cold from the machine through the connector handles 32 which otherwise would cause "sweating" of the handles and precipitation of moisture from the heated air which comes in contact with the handles when the door 22 is open.

From the foregoing, it will be seen that I have provided a dispensing machine which is particularly adapted to extrude, cut-off and dispense materials of a plastic nature such for example as butter or other food stuffs or dairy products, the machine being particularly characterized by:

1. Its measurement of the thickness and control of the temperatures of the extruded material at the extrusion orifice 28.

2. The provision of a refrigerated tube 28 and container 27, the body portions of which may be formed of dairy metal or similar heat conducting material and which is closed at its front by a pivotally mounted panel 29.

3. The pivotally mounted door 29 which may be fully opened to permit complete access to all parts of the refrigerated container 27 and the extrusion orifice 28 so as to permit ready servicing or cleaning of this portion of the machine.

4. The operating cycle of the machine which provides instantaneous operation and cut-off of the butter chip while provision is made to cut the pressures off the cylinder 36 to prevent any undesired or unintended extrusion of the material. This is accomplished by causing the hydraulic power fluid to be by-passed to the sump 48 during the cut-off operation, and again after the completion of the extrusion cycle. This relieves the extrusion pressure on the materials in the container 27 so that after the extruded material is cut-off and after the next chip has been extruded there is no further pressure exerted on it to effect extrusion thereof until the cut-off mechanism is re-set for the next machine operation.

I claim:

1. A dispensing machine adapted on each operation to extrude, cut-off and dispense a predetermined portion of an extrudable bulk material, said machine including an extrusion orifice, power means for extruding an extrudable material through said orifice, an adjustable control system actuated by the material as extruded through said orifice for regulating the extent of permitted extrusion of said extruded material, said control system comprising a photo-electric control circuit, a light source adapted to throw a light beam across said orifice to activate a photo-electric cell in said photo-electric control circuit until the path of said beam is cut by the material extruded from said orifice, a power actuated cut-off mechanism adapted to cut-off a predetermined thickness of extruded material, and a counting device actuated by said cut-off mechanism to record the number of operations of the unit.

2. A dispensing machine adapted to extrude, cut-off and dispense a predetermined portion of an extrudable bulk material, said machine including an extrusion orifice, power means for extruding an extrudable material through said orifice, an adjustable control actuated by the material as extruded through said orifice for regulating the extent of permitted extrusion of said extruded material, and a power actuated cut-off mechanism adapted to cut-off a chip or patty of extruded material, and comprising a spring cushioned vertically reciprocating knife mounted adjacent said orifice and yieldably connected with a power member for driving said knife in its downward cut-off stroke, and a counting device actuated in response to relative movement of said knife and power member.

3. A dispensing machine particularly adapted to cut-off, dispense and extrude predetermined servings of a bulk food material and comprising an open face storage and pressure chamber communicating with an extrusion orifice, a panel pivotally mounted on said chamber and normally closing the open face thereof, clamping means mounted independently of said chamber and acting on said panel to hold it in its closed position, power means for extruding the bulk food material from said chamber and through said orifice, an adjustable control member for regulating said power means in accordance with the amount of material extruded through said orifice, and a power actuated cut-off mechanism adapted to cut-off a predetermined portion of the extruded material.

FREDERICK ORLO JOHNSON.

REFERENCES CITED

The following references are of record in the file of this patent:

UNITED STATES PATENTS

| Number | Name | Date |
| --- | --- | --- |
| 607,167 | Fontneau | July 12, 1898 |
| 902,088 | Kintner | Oct. 27, 1908 |
| 1,155,590 | McLane | Oct. 5, 1915 |
| 1,271,657 | Bock | July 9, 1918 |
| 1,454,769 | Schwantee | May 8, 1923 |
| 1,837,592 | Skoverski | Dec. 22, 1931 |
| 1,941,552 | Henry et al. | Jan. 2, 1934 |
| 2,010,777 | Grotta | Aug. 6, 1935 |
| 2,021,340 | Tripolitis | Nov. 19, 1935 |
| 2,162,106 | Ness | June 13, 1939 |
| 2,478,401 | Johnson | Aug. 9, 1949 |

FOREIGN PATENTS

| Number | Country | Date |
| --- | --- | --- |
| 237,689 | Germany | Aug. 25, 1911 |